US010882093B2

(12) United States Patent
Livingstone et al.

(10) Patent No.: US 10,882,093 B2
(45) Date of Patent: Jan. 5, 2021

(54) HOT STAMP CELL

(71) Applicant: THE ELECTROMAC GROUP, INC., Windsor (CA)

(72) Inventors: Greg Livingstone, Windsor (CA); Norm Lehn, Amherstburg (CA); Mike Benoit, Tilbury (CA)

(73) Assignee: THE ELECTROMAC GROUP, INC., Windsor (CA)

( * ) Notice: Subject to any disclaimer, the term of this patent is extended or adjusted under 35 U.S.C. 154(b) by 664 days.

(21) Appl. No.: 15/460,876

(22) Filed: Mar. 16, 2017

(65) Prior Publication Data

US 2017/0274438 A1    Sep. 28, 2017

Related U.S. Application Data

(60) Provisional application No. 62/312,686, filed on Mar. 24, 2016.

(51) Int. Cl.
   *B21D 22/02*    (2006.01)
   *B25J 15/00*    (2006.01)
   (Continued)

(52) U.S. Cl.
   CPC ........ *B21D 22/022* (2013.01); *B25J 15/0014* (2013.01); *C21D 8/005* (2013.01); *C21D 9/0068* (2013.01); *C21D 2211/008* (2013.01)

(58) Field of Classification Search
   CPC ...... B21D 22/022; B21D 37/16; B21D 43/06; B21D 43/10; B25J 15/0052;
   (Continued)

(56) References Cited

U.S. PATENT DOCUMENTS

| 657,758 A | * | 9/1900 | Coulston | F23M 5/00 |
| | | | | 126/144 |
| 4,039,775 A | * | 8/1977 | Andra | B01L 7/00 |
| | | | | 219/385 |

(Continued)

FOREIGN PATENT DOCUMENTS

| CN | 104690172 | * | 6/2015 | |
| DE | 102013005397 A1 | * | 10/2014 | ............. C21D 1/673 |

(Continued)

OTHER PUBLICATIONS

Machine Translation of JP-2013188793-A, Wada et al., Publication Year 2013, Total pp. 12 (Year: 2019).*

(Continued)

*Primary Examiner* — Teresa M Ekiert
*Assistant Examiner* — Sarkis A Aktavoukian
(74) *Attorney, Agent, or Firm* — Bhole IP Law; Anil Bhole; Marc Lampert

(57) ABSTRACT

A hot stamp cell has a source of blanks, an oven to elevate the temperature of the blank, and a press to form the blank to the required shape. The oven has a pair of access doors located on opposite sides. A first robot is provided to move a blank from the source to the oven through one of the doors and a further robot provided to remove the blank from the oven through the other door. Each of the robots has a material handling tool that includes a fork with tines to carry a blank and a gripping mechanism to secure the blank to the tines. The floor of the oven has a support surface to allow stable support of the blank during heating. The floor is provided with channels extending between the doors dimensioned to receive the tines. The channels permit placement of the blank on to the surface by lowering of the fork and subsequent removal of the fork from the oven.

14 Claims, 21 Drawing Sheets

(51) Int. Cl.
*C21D 8/00* (2006.01)
*C21D 9/00* (2006.01)

(58) Field of Classification Search
CPC ............... B25J 15/0014; B25J 15/0028; B25J 15/0009; B25J 15/0433; B21J 13/10; C21D 9/46; F23G 2900/53801; F27B 9/185; F24C 15/005; F24C 15/007; F24C 15/026; F24C 15/028
USPC .......... 414/225.01, 226.01, 226.02; 126/144, 126/145, 190
See application file for complete search history.

(56) References Cited

U.S. PATENT DOCUMENTS

| | | | |
|---|---|---|---|
| 7,704,447 B2* | 4/2010 | Danger | F27D 3/0024 266/249 |
| 8,777,551 B1* | 7/2014 | Widder | B65G 47/90 414/796.6 |
| 2012/0073347 A1* | 3/2012 | Luckey | B21D 37/16 72/324 |
| 2013/0252011 A1* | 9/2013 | Deshpande | C01B 33/037 428/544 |
| 2014/0144198 A1* | 5/2014 | Potocki | C21D 9/005 72/342.1 |

FOREIGN PATENT DOCUMENTS

| | | | | |
|---|---|---|---|---|
| EP | 2845698 A1 * | 3/2015 | | B25J 15/0004 |
| JP | 2013188793 | * | 9/2013 | |
| JP | 2014034689 | * | 2/2014 | |
| JP | 2015229797 | * | 12/2015 | |
| WO | WO-2010127837 A2 * | 11/2010 | | B21J 1/06 |

OTHER PUBLICATIONS

Machine Translation of JP-2014034689-A, Seiji, Publication Year 2014, Total pp. 18 (Year: 2019).*
Machine Translation of CN-104690172-A, An et al., Publication Year 2015, Total pp. 9 (Year: 2019).*
Machine Translation of DE-102013005397-A1, Hund Ralf, Publication Year 2014, Total pp. 14 (Year: 2019).*
Machine Translation of EP-2845698-A1, Kuhmichel Christoph, Publication Year 2015, Total pp. 18 (Year: 2019).*
Machine Translation of JP-2015229797-A, Shinjiro, Publication Year 2015, Total pp. 26 (Year: 2019).*

* cited by examiner

HOT STAMP CELL

CROSS-REFERENCE TO RELATED APPLICATIONS

This application claims the benefit of the filing date of U.S. Provisional Patent Application No. 62/312,686, entitled "Hot Stamp Cell" filed Mar. 24, 2016, the contents of which are hereby incorporated by reference.

FIELD OF THE INVENTION

The present invention relates to hot stamp cells.

DESCRIPTION OF THE PRIOR ART

Stamping is a process by which a metal blank is formed into a complex shape either for further processing or for end use. Blanks are usually cut from stock material such as sheet, plate, rod, or tube and placed in a tool in a press. The load applied by the press forces the blank to the shape of the tool to produce the required complex shape.

Hot stamping uses a similar process but elevates the temperature of the blank. This not only reduces the forces required to form the blank to the required shape but also can take advantage of the metallurgical properties of the blank to produce a superior product. Typically the tool is cooled and therefore a hot blank cools rapidly during the forming operation. The cooling results in a change of the metallurgical structure and enhances the properties of the finished article.

Hot stamping is typically used in high-volume components, such as those used in the automotive industry, and efficiency of production is paramount. Heating to the required temperature and cooling under controlled conditions introduces intermittent steps within what is essentially a continuous process. Intermittent steps within the process can reduce efficiency and failure of one of the process steps can lead to a significant maintenance problem and backing up of the product flow.

One of the common problems found in existing hot stamp cells is the accurate placement of the blank as it moves from one stage of the process to another. It is common to utilize a linear conveyor to move the blanks through a heating zone, but if a blank is misplaced on such a conveyor then there is a likelihood that the entire production of the blanks is interrupted until the misplaced blank is removed. In such a system, the blank is gripped at opposite ends and released when over the conveyor. The blank is essentially dropped on to the conveyor and is relatively easily misplaced. Where the conveyor is moving the blank through an oven over an extended period, there is clearly a significant risk of interruption of the process whilst a misplaced blank is retrieved. One common method of moving blanks through a heating zone is with a series of rotating ceramic rollers. Often even a properly placed blank can wander as it makes its way through a very long furnace. If a blank has a burred edge or some curvature due to residual coil memory, it can easily begin to drift out of position as it transfers from roller to roller. If there is a delay somewhere in the process, over-soaked blanks must be discarded, as their metallurgical properties will no longer meet specifications. Since these furnaces have so many blanks in the process of making their way through the heating cycle, purging the over-soaked blanks produces a lot of waste. Similarly, a misplaced blank within the tool requires the operation of the press to be interrupted whilst the blank is removed.

German patent application 102010027439 discloses a hot stamped cell in which a blank is moved into a furnace using a robot arm. The furnace has cooling cells at opposite ends of the furnace so that the outer ends of the blank may be cooled while the central portion is heated. The blank is supported on webs between end cooling blocks. The oven disclosed in this German application has a single door meaning that each of the blanks must be inserted and removed through the same door.

German patent application 102009019496 shows a furnace having a plurality of ovens or heating stations to treat a part. The heating station has a series of vertically stacked heat chambers and the part enters and exits at separate points of the heat chamber. The blanks are moved into and through the chamber on a trolley or cart and utilizes stationary columns with lifts to move the part into and out of the heat chambers of the furnaces.

Such an arrangement is complex and subjects the trolley to the extended heating cycle of the furnace.

German patent application 2232426 also discloses a series of ovens or heating stations with the floor of the heating chamber elevated to support the blank.

In each of these references, there is no control of the blank as it is placed and inadvertent displacement may occur resulting in a reduction in throughput.

It is therefore an object of the present invention to obviate or mitigate the above disadvantages.

SUMMARY OF THE INVENTION

According to one aspect of the present invention there is provided a hot stamp cell having a source of blanks, an oven to elevate the temperature of the blank, and a press to form the blank to the required shape. The oven has a pair of access doors located on opposite sides. A first robot is provided to move a blank from the source to the oven through one of the doors and a further robot provided to remove the blank from the oven through the other door. Each of the robots has a material handling tool that includes a fork with tines to carry a blank and a gripping mechanism to secure the blank to the tines. The floor of the oven has a support surface to allow stable support of the blank during heating. The floor is provided with channels extending between the doors dimensioned to receive the tines. The channels permit placement of the blank on to the surface by lowering of the fork and subsequent removal of the fork from the oven.

Preferably, the gripping mechanism engages the opposite side of the blank to the forks and is releasable upon placement of the blank on the support surface.

According to a further aspect of the invention, there is provided a material handling tool for a robot comprising a fork having a pair of spaced tines and a gripping mechanism to locate a blank on the tines. The gripping mechanism includes feet movable toward and away from the tines to vary the spacing between the feet and the tines. The material handling tool includes actuators connected to the feet to move them relative to the tines.

BRIEF DESCRIPTION OF THE DRAWINGS

Embodiments of the invention will now be described by way of example only with reference to the accompanying drawings in which.

DETAILED DESCRIPTION OF THE INVENTION

Figure 1:
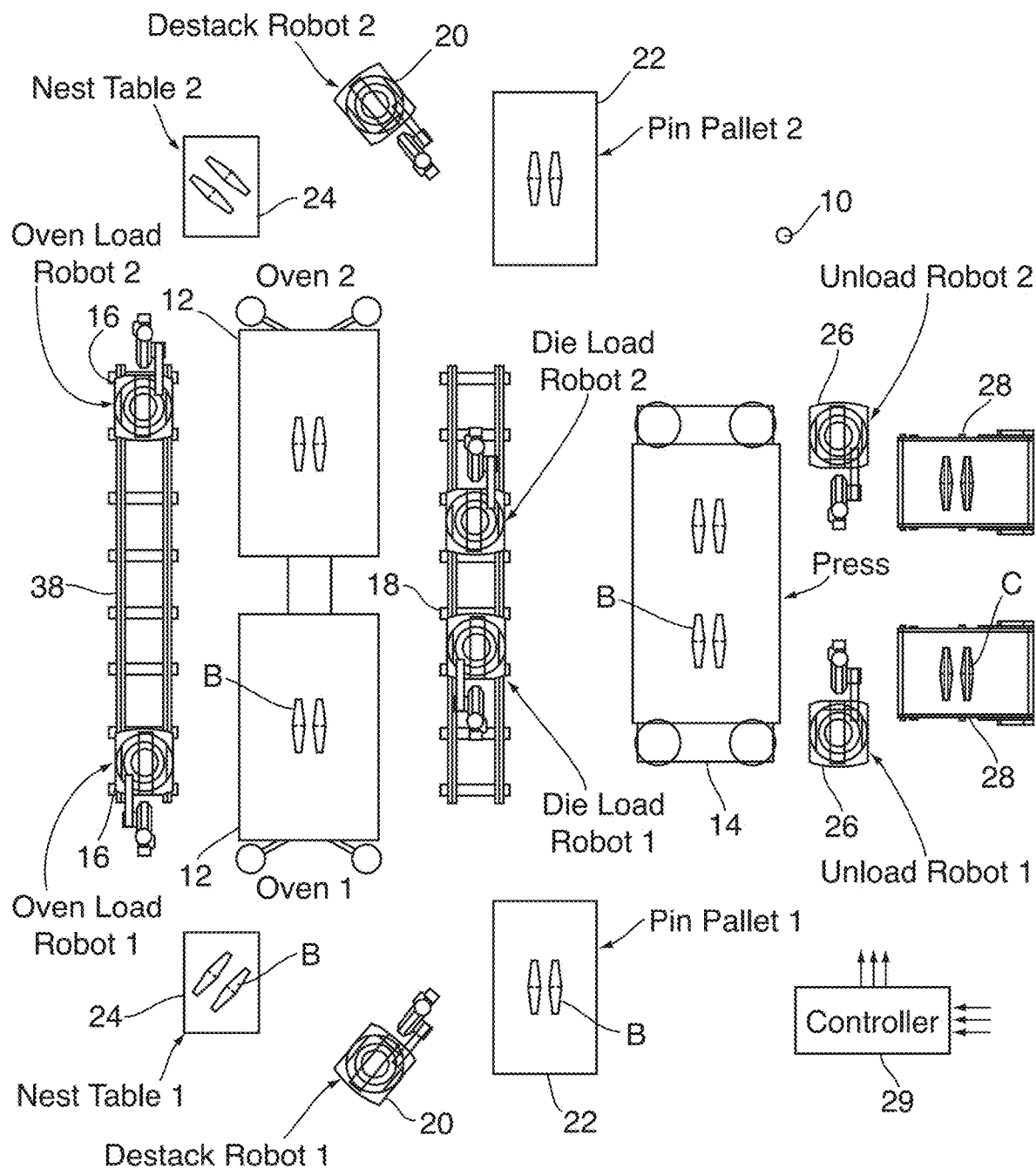
FIG. 1 is a schematic representation of a first embodiment of hot stamp cell

Referring therefore to FIG. 1, a hot stamp cell generally indicated at 10 includes a pair of ovens 12 and a press 14. Robots 16 are located to one side of each of the ovens and similar robots 18 are located between the ovens 12 and the press 14. It will be noted from FIG. 1 that a pair of robots 16 feed a pair of ovens 12 and the robots 18 transfer blanks B from each of the ovens 12 to supply the press 14. As the processing of the blanks B is similar through each of the ovens 12, only one stream of the cell 10 will be described in detail.

De-stacking robots 20 are located between a pallet 22 and a transfer table 24 and unloading robots 26 are positioned on the opposite side of the press 14 to the robots 18 with conveyors 28 located adjacent to the unloading robots 26. Transfer table 24 includes a plinth 25 to locate a blank B to provide positive and repeatable blank positioning. The plinth 25 also maintains the blanks B elevated on plinths to provide a clearance beneath the blanks B. The plinth 25 includes adjustable guides to permit slight corrections in the positioning of the blanks B and an integrated weigh scale system and proximity sensors ensure that the blanks are indeed present, properly seated and not doubled-up on top of each other. The purpose of the transfer table 24 is to "hand-off" the destacked blanks that are picked up by the robot 20 to the robots 16 that are able to load the ovens. The use of the transfer table 24 ensures an accurate orientation of the blanks B after removal from the pallet 22.

The purpose of the hot stamp cell 10 is to process blanks indicated at B into a finished component C. The operation of the robots is controlled by a central controller 29 that sequences the movement of the robots to move the blanks B through the cell 10 to provide the finished components C.

Initially, the blanks B are located within the pallet 22 and the de-stacking robot 20 transfers blanks B individually to the transfer table 24. The blanks are held at the transfer table 24 until and a robot 16 secures the blanks B and transfers them into the oven 12. The blanks B remain in the oven 12 until they have attained the required temperature and are then removed from the oven 12 by the robots 18 and placed into the press 14. The press operates to transform the blank into a complex shape and the unloading robot 26 removes the finished shape and places it on the conveyor 28.

Figure 2:
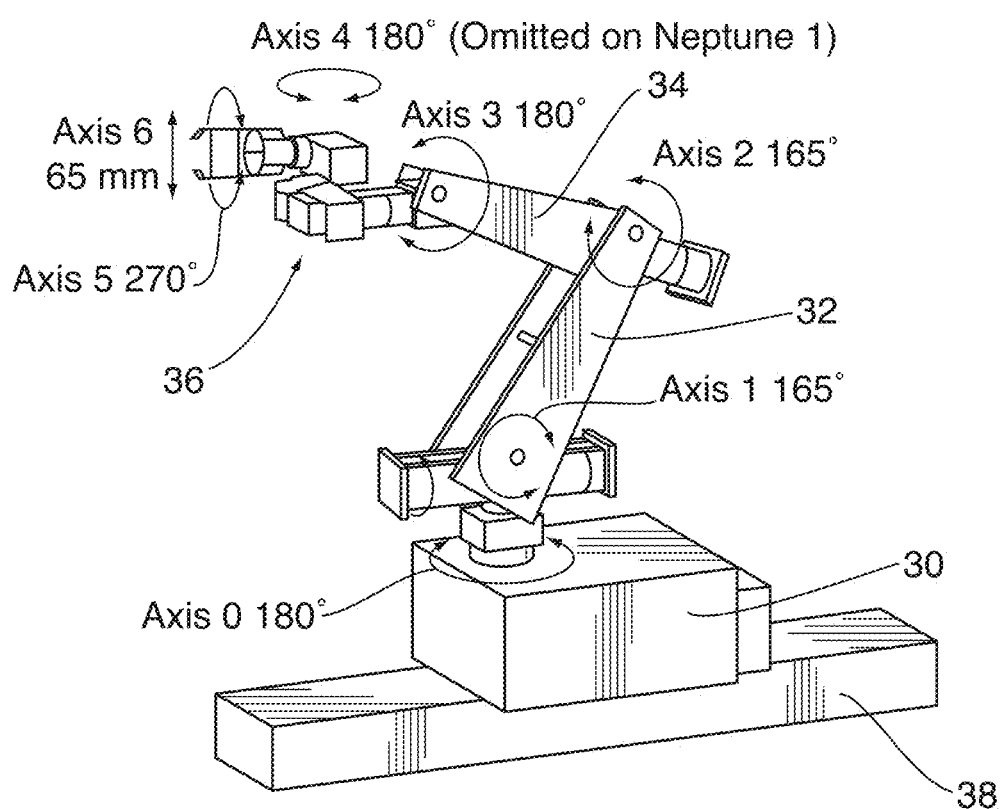
FIG. 2 is a representation of a robot used with the hot stamp cell of FIG. 1

The robots 16, 18, 20 and 26 may be of any generally available form having the required degrees of movement to effect transfer between the stations. A typical form of robot 16 is shown in FIG. 2 and has a base 30 with a pair of pivotally connected arms 32, 34. The arm 32 is pivotally mounted on the base 30 so as to be movable about orthogonal horizontal and vertical axes and a wrist 36 is secured to the distal end of the arm 34. The base 30 is mounted on rails 38 to allow translation of the base 30. The wrist 36 allows movement about three mutually perpendicular axes and carries a material handling device 40 at the opposite end to the arm 34.

Figure 3:
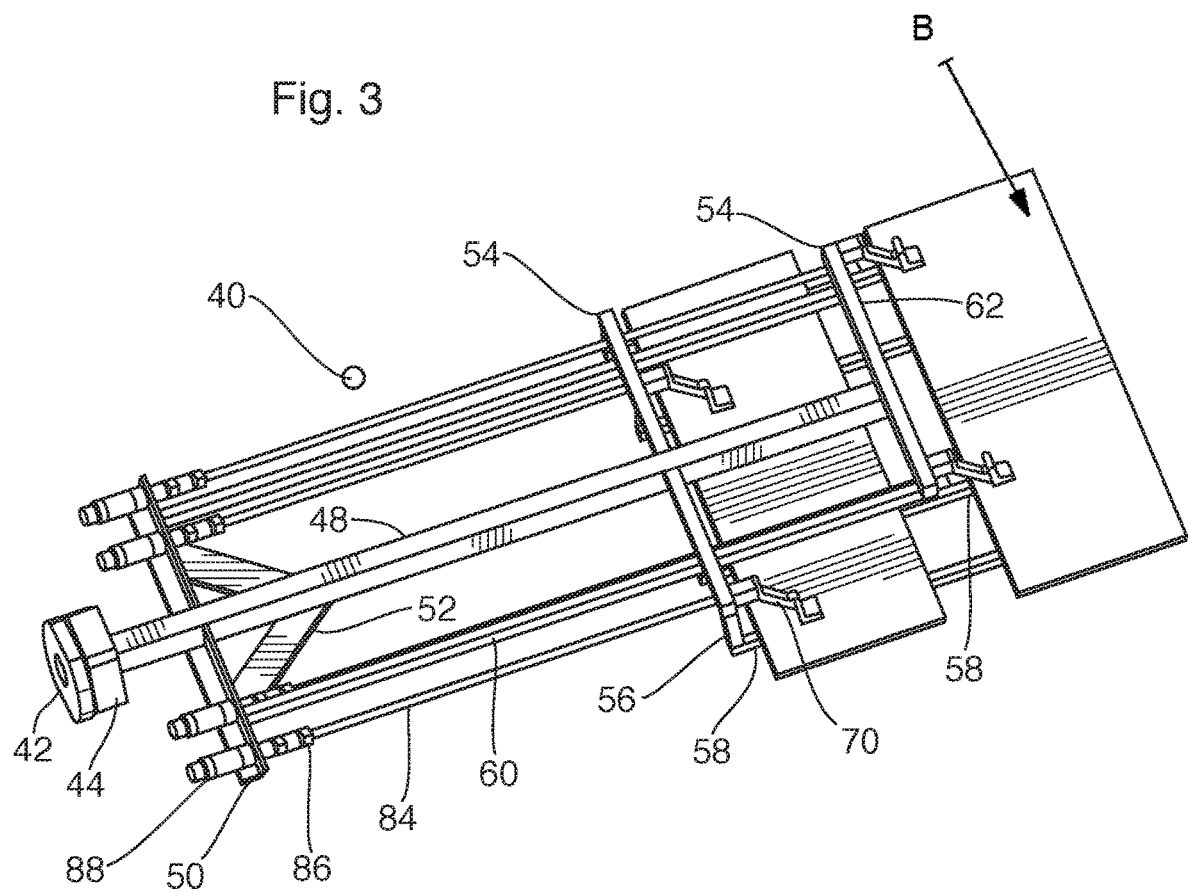
FIG. 3 is a perspective view of a material handling tool used on the robot of FIG. 2
Figure 4:
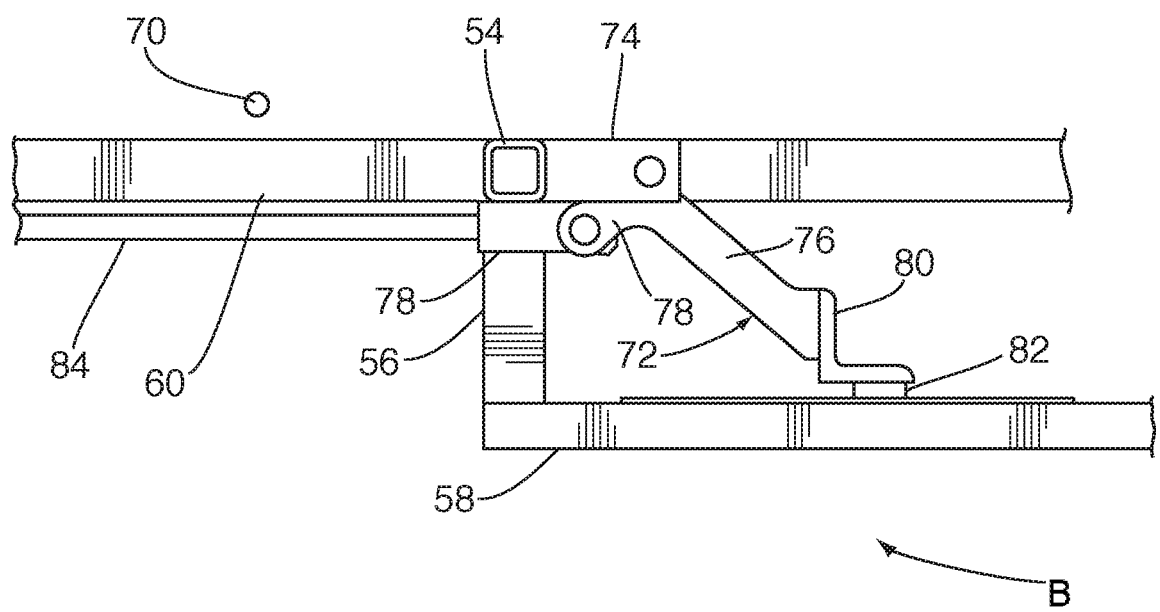
FIG. 4 is a side elevation of the material handling tool of FIG. 3
Figure 5:
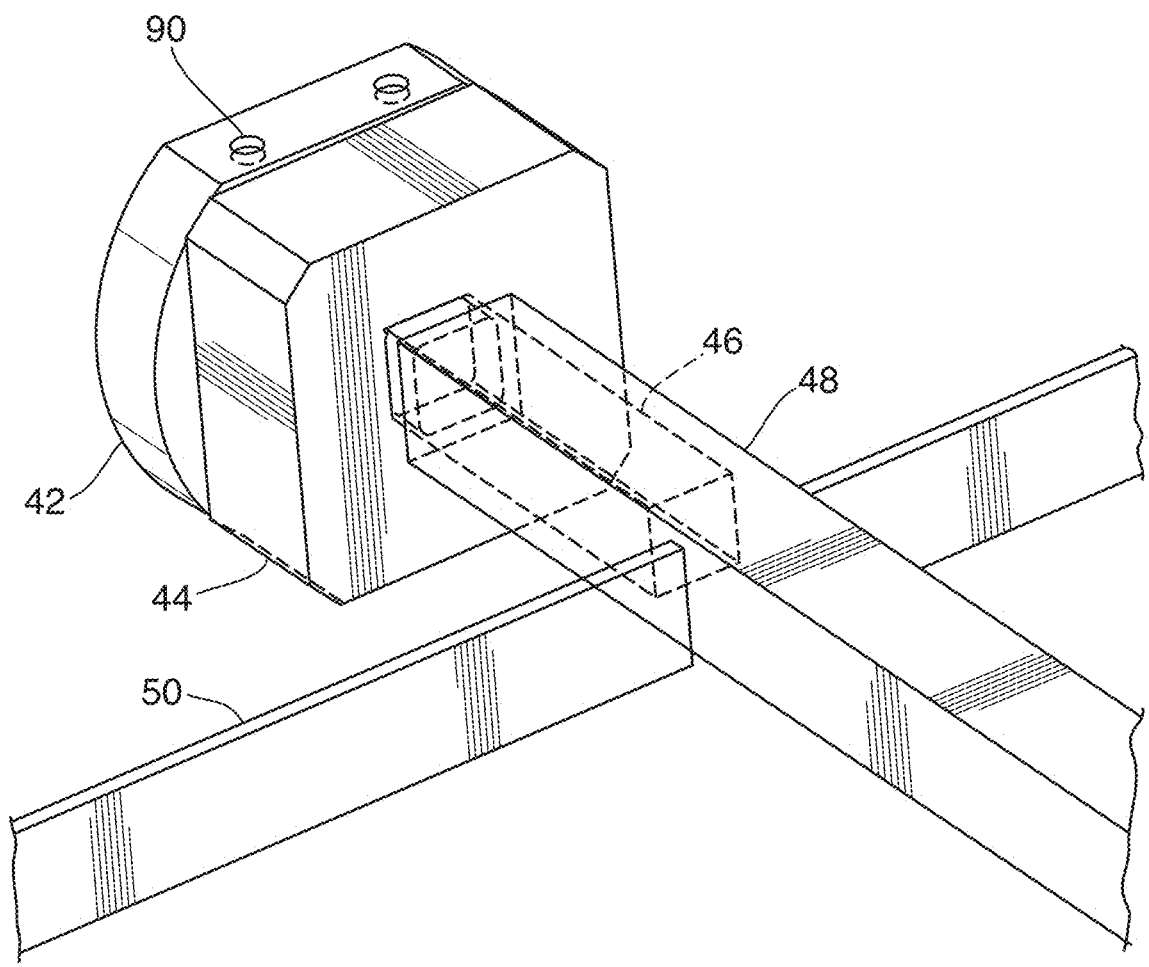
FIG. 5 is an enlarged view of a connection of the material handling tool of FIG. 3 to the robot.

The material handling device 40 can best be seen in FIGS. 3 through 5 and includes a mounting plate 42 secured to the wrist 36. The plate 42 has a mounting block 44 bolted to one face. The block 44 has a stub shaft 46 projecting from the block 44 to receive a hollow beam 48.

The beam 48, best seen in FIG. 3, projects outwardly from the shaft 46 and has a transverse reaction plate 50 located adjacent to the mounting block 44. Braces 52 structurally connect the reaction plate 50 to the beam 48. The beam 48 supports a number of outriggers 54 which extend laterally to either side of the beam 48. The outriggers 54 have vertical spacers 56 which connect the outriggers 54 to tines 58. The tines 58 extend parallel to the beam 48 and project beyond the end of the beam 48. In the embodiment shown in FIG. 3, four tines are provided, two on either side of the beam 48.

The outriggers 54 are further stabilized by a pair of stringers 60 that extend from the reaction plate 50 to a cross member 62 located at the remote end of the beam 48. The stringers are connected to each of the outriggers and bracing 64 provided between the beam 48 and respective ones of the outriggers 54.

Gripping mechanisms 70 are positioned on the outriggers 54 and cross member 62 and are generally aligned with the tines 58. The gripping mechanism 70 is similar each location and can best be seen in FIG. 4.

The gripping mechanism 70 includes a bell crank 72 that is pivotally connected to a U shaped fulcrum 74. The fulcrum 74 is secured to the outrigger 54 at a location aligned with one of the tines 58. The bell crank 72 has a pair of arms 76, 78 integrally formed and extending to either side of the pivotal connection. A pad 80 is pivotally connected to the arm 76 and has an enlarged foot 82 facing the tine 58.

The arm 78 is connected to a rod 84 that extends to the reaction plate 50. A turnbuckle 86 connects the rod 84 to an actuator 88 that is mounted on the reaction plate 18. It will be noted that the gripping mechanisms 70 are offset from one another to allow the rods 84 to extend in parallel to spaced locations on the reaction plate 50. The actuators 88 are typically pneumatic actuators that receive air through flexible piping from ports 90 provided in the mounting plate 42. The ports 90 in turn are connected to control valve's (not shown) under the control of central controller 29.

The material handling devices 40 on robots 16, 18 are utilized to carry blanks B and load and unload them in to a respective one of the ovens 12. Referring to FIGS. 6 through 10, each of the ovens 12 has an exterior housing 100 having front wall 102, rear wall 104 and side walls 106. The designation "front", "rear", and "side" is with reference to the flow of blanks B through the oven 12, and is used to facilitate description of the oven 12 rather than imply any specific spatial orientation with respect to the surroundings. Each of the ovens 12 has a plurality of heating zones 108 arranged vertically above one another within the housing 100. In the oven 12 shown in FIG. 6, five heating zones are arranged one above the other. Each of the heating zones 108 has a burner 110 located on the side panels 106 and extending in to the interior of the housing 100.

Figure 8:
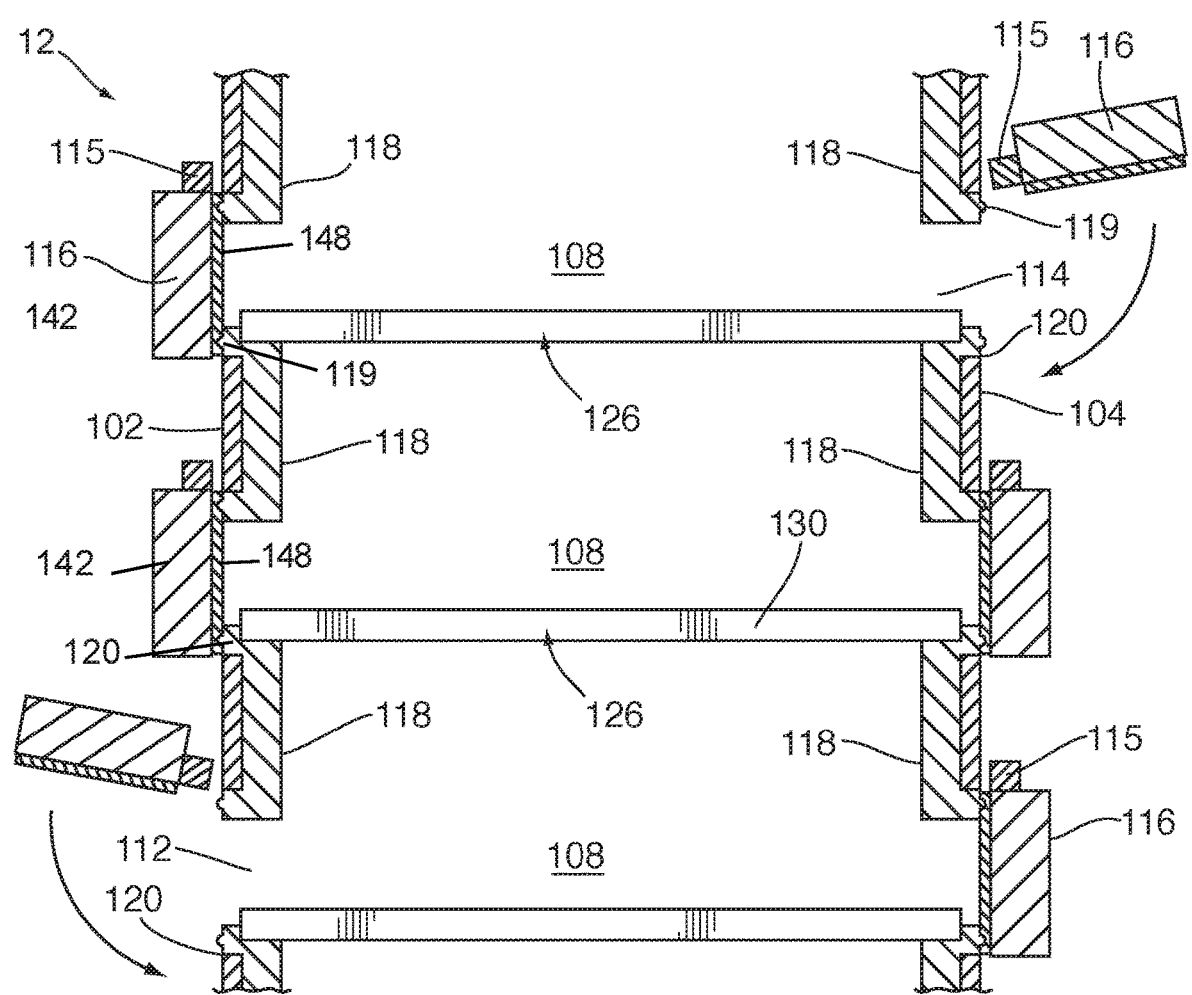
FIG. 8 is a horizontal section through the oven of FIG. 6
Figure 9:
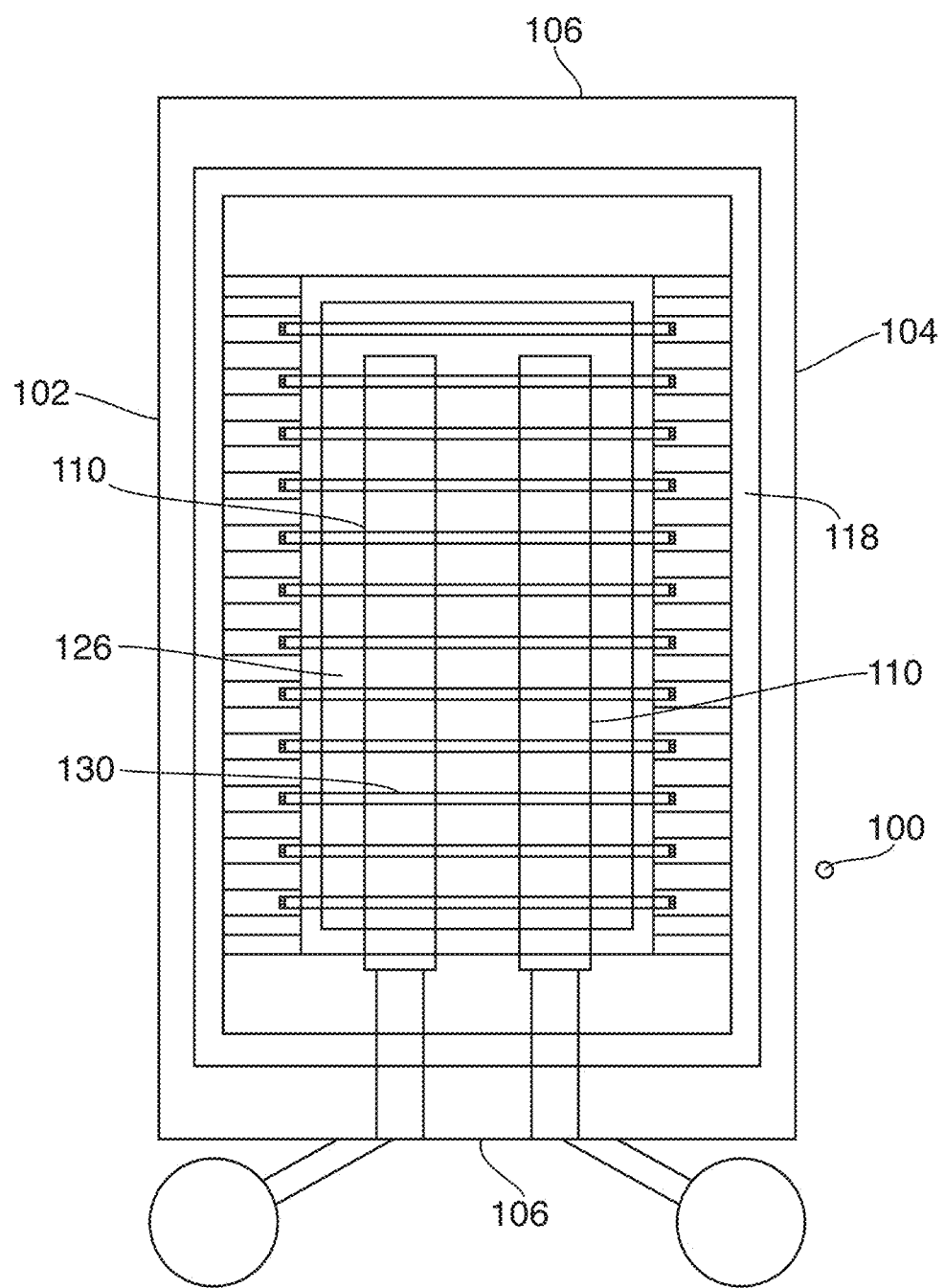
FIG. 9 is a vertical section through the oven of FIG. 6
Figure 10:
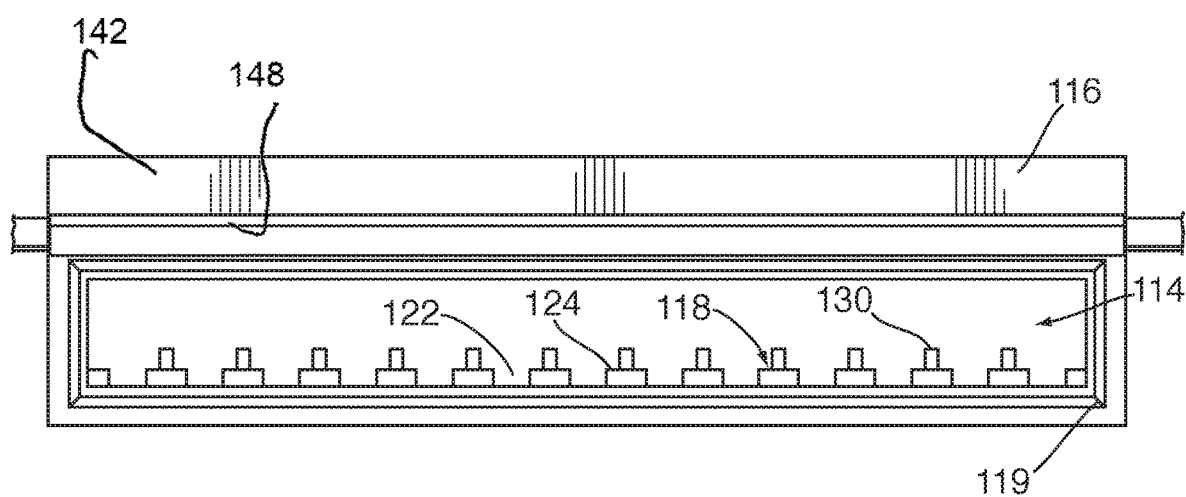
FIG. 10 is a view in the direction of the arrow X-X of FIG. 7

At each of the heating zones 108, the front wall 102 and rear wall 104 are formed with elongate openings 112, 114 respectively that extend between the side walls 106. A tube 115 extends along the upper edge of the opening 112, 114 and is pivotally mounted to respective ones of the walls 102, 104. A door assembly 116 is rigidly mounted to the tube 115 so as to hang down over each of the openings 112, 114 and selectively cover and uncover the opening as will be described in more detail below. The interior of the housing 100 is lined with refractory brick lining 118 that totally covers the interior of walls 102, 104, 106. As can be seen in FIG. 8, the refractory lining 118 extends above the lower edge 120 of the openings 112, 114 and are castellated as indicated in FIG. 10. The lining 118 is formed with a series of notches 122 that are spaced apart across the opening 112, 114 to provide upstanding lands 124 between a pair of notches 122.

A hearth 126 is provided at each of the heating zones 108 to support a blank B. The hearth 128 is formed by stainless steel rods 130 that extend between the front wall 102 and rear wall 104 and are supported at opposite ends in the lands 124. The rods 130 are rectangular in cross section and nest in recesses in the lands 124 for a stable location. The rods 130 are located so that the upper surface of the rod 130 sits above the upper surface of the refractory 118. The notches 122 on either side of the rods 130 define channels extending between the openings 112, 114 and are dimensioned to receive the tines 54 of the material handling device 40. The notches 122 are deep enough to permit the tine to be placed beneath the blank B without disturbing it when it is supported on the hearth 126.

Figure 6:
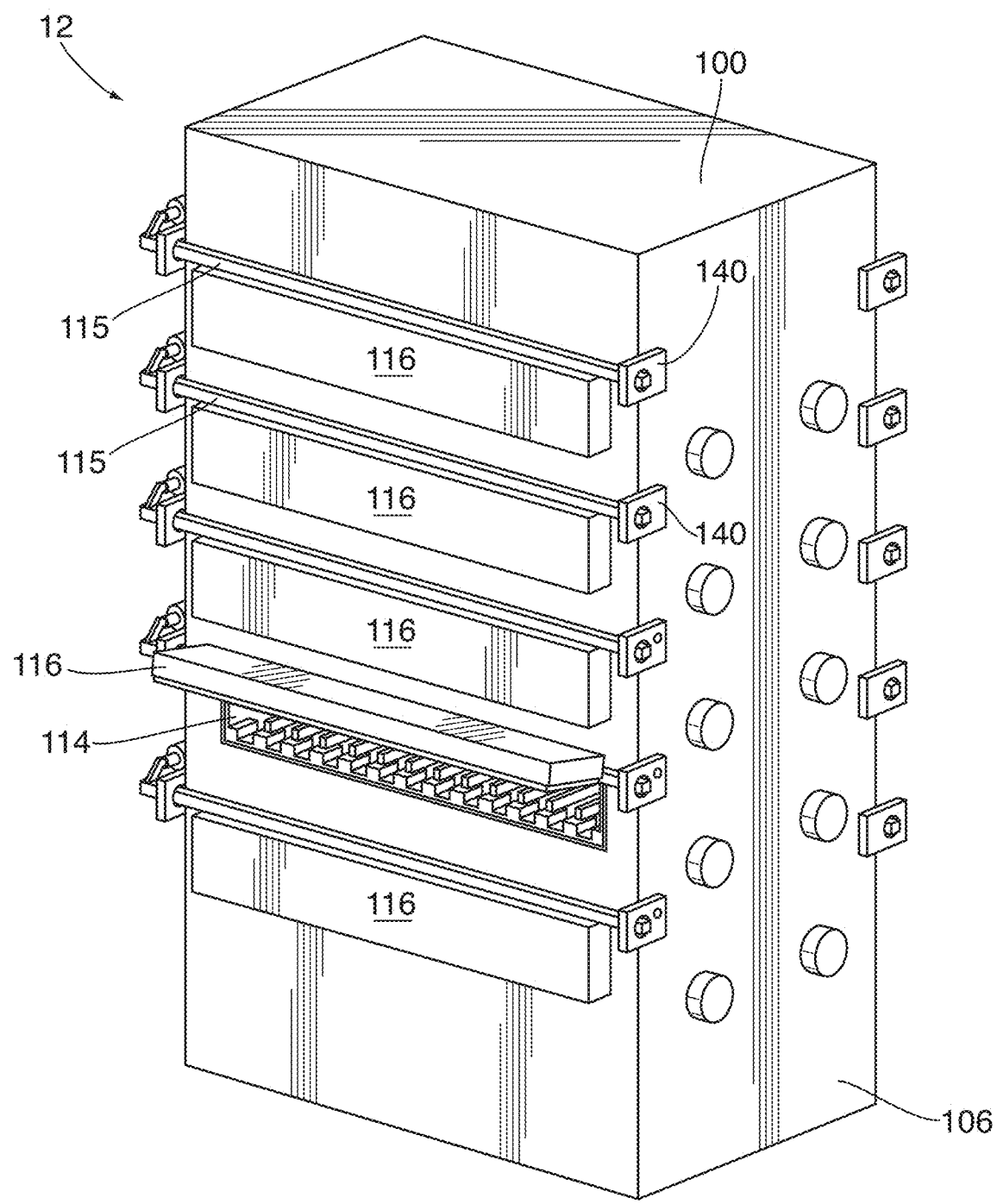
FIG. 6 is a perspective view of an oven used in the hot stamp cell of FIG. 1
Figure 7:
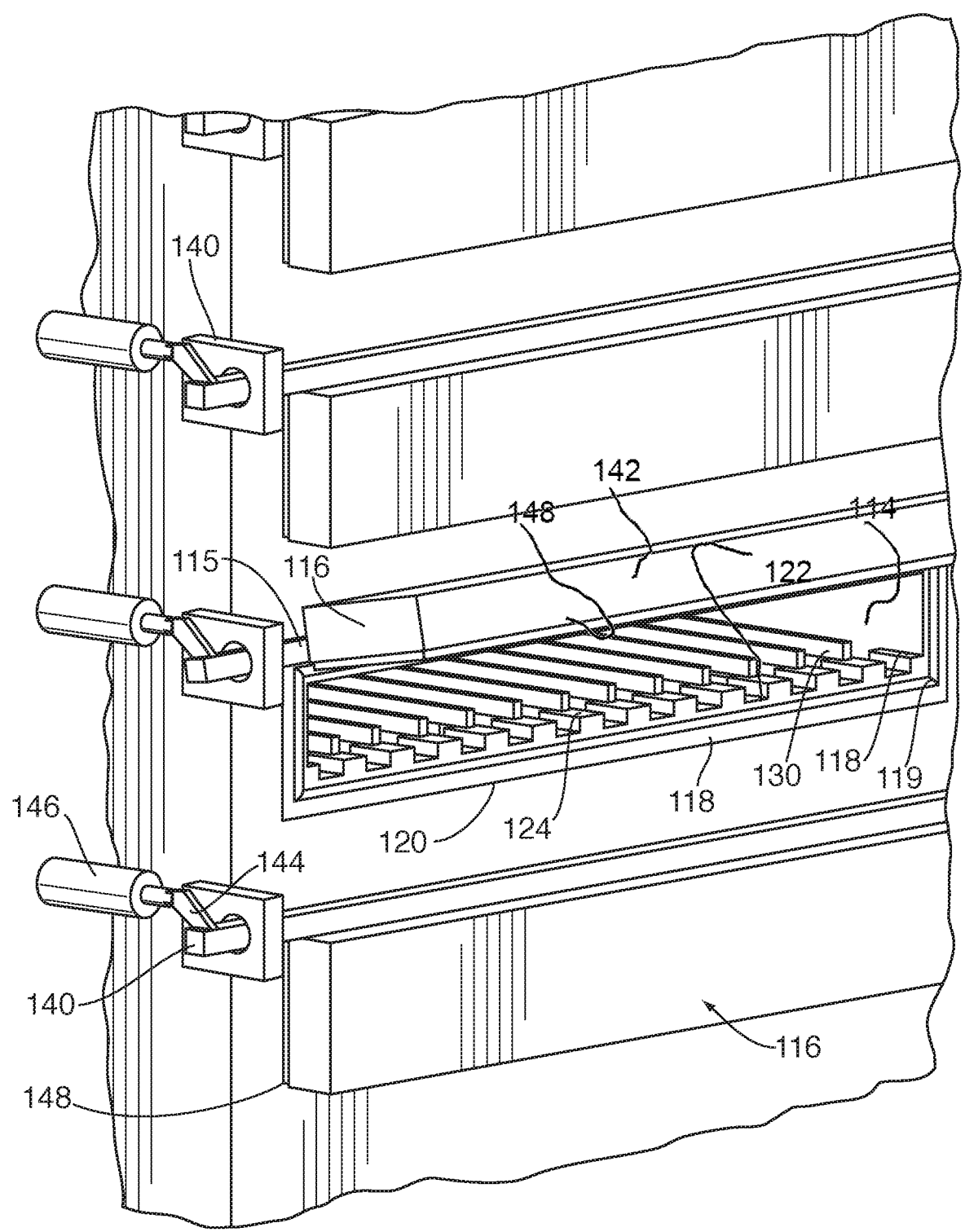
FIG. 7 is a perspective view of a portion of the oven shown in FIG. 6

As noted above, the door assembly 116 is mounted on the tubes 115 above each of the openings 112, 114. The tube 115 projects outwardly from each of the side walls 116 and is supported in a bearing 140. The tube 115 is pivotally mounted by the bearing 140 and so the door assembly 116 is moveable from a generally vertical disposition, as shown in FIG. 7, where the opening 112, 114 is covered, to a generally horizontal position, as shown in FIG. 6, in which the opening is uncovered. Movement of the door assembly 116 is controlled by a crank 144 secured to the tube 115 at one end of the opening 112, 114. The crank 144 is connected at one end to a pneumatic cylinder 146 and at the opposite end to the door panel 142. Extension and retraction of the cylinder 146 therefore rotates the crank 144 and pivots the door panel 142 between vertical and horizontal positions.

The door assembly 116 includes a door panel 142 that carries a resilient, compressible refractory lining 148 to protect the panel. The refractory lining 148 around opening 112,114 has a raised cast bead 119, offset from the perimeter of the opening, 112, 114 that compresses the refractory lining 148 against the door as it moves to a vertical position.

It will be noted the centre of mass of the door assembly 116 is offset from the pivot axis of pins 140 so that in the vertical position there is a significant couple tending to compress the gasket and maintain an effective seal around the opening 112, 114.

Figure 11:
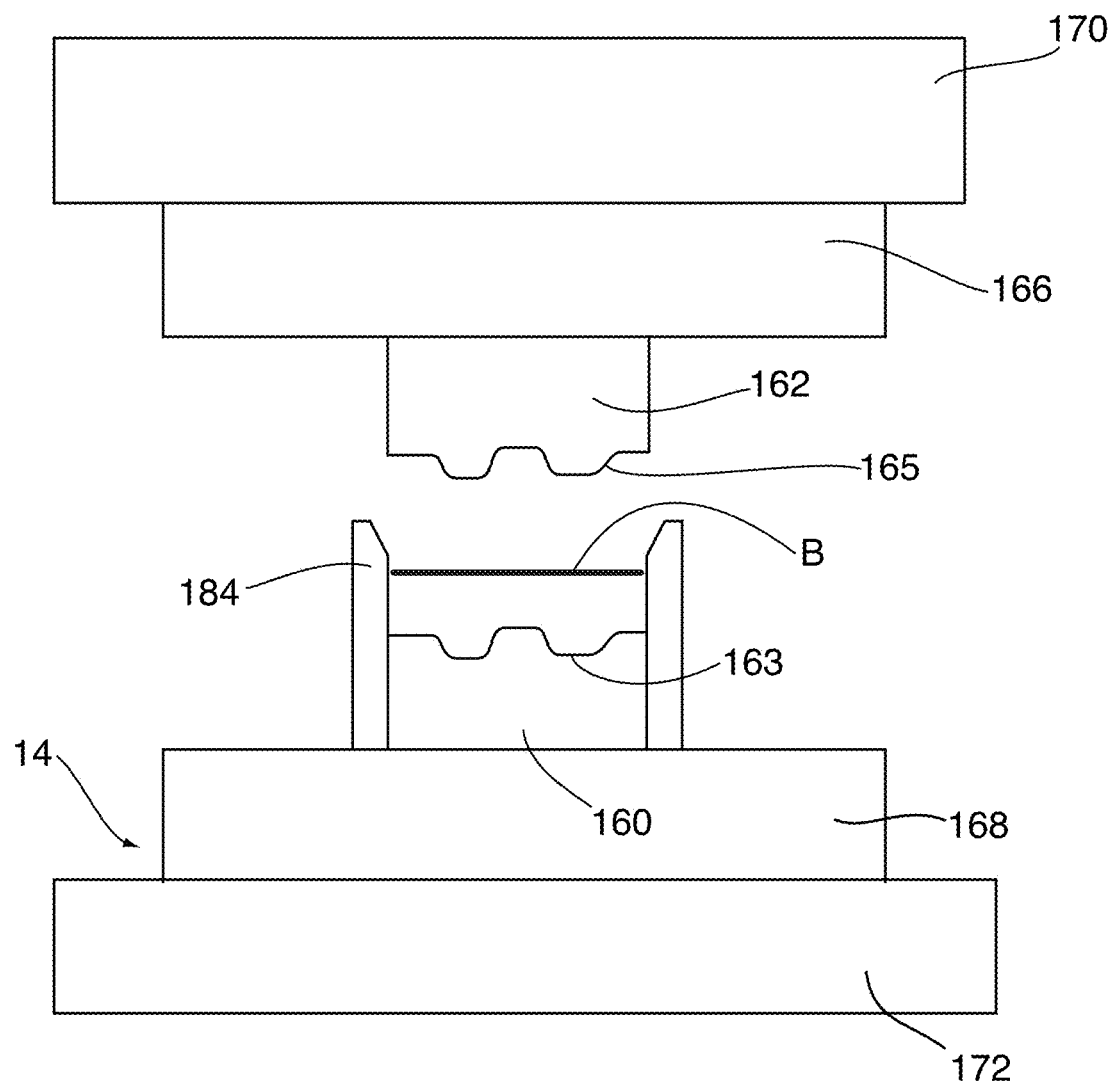
FIG. 11 is a perspective view of a press.
Figure 15:
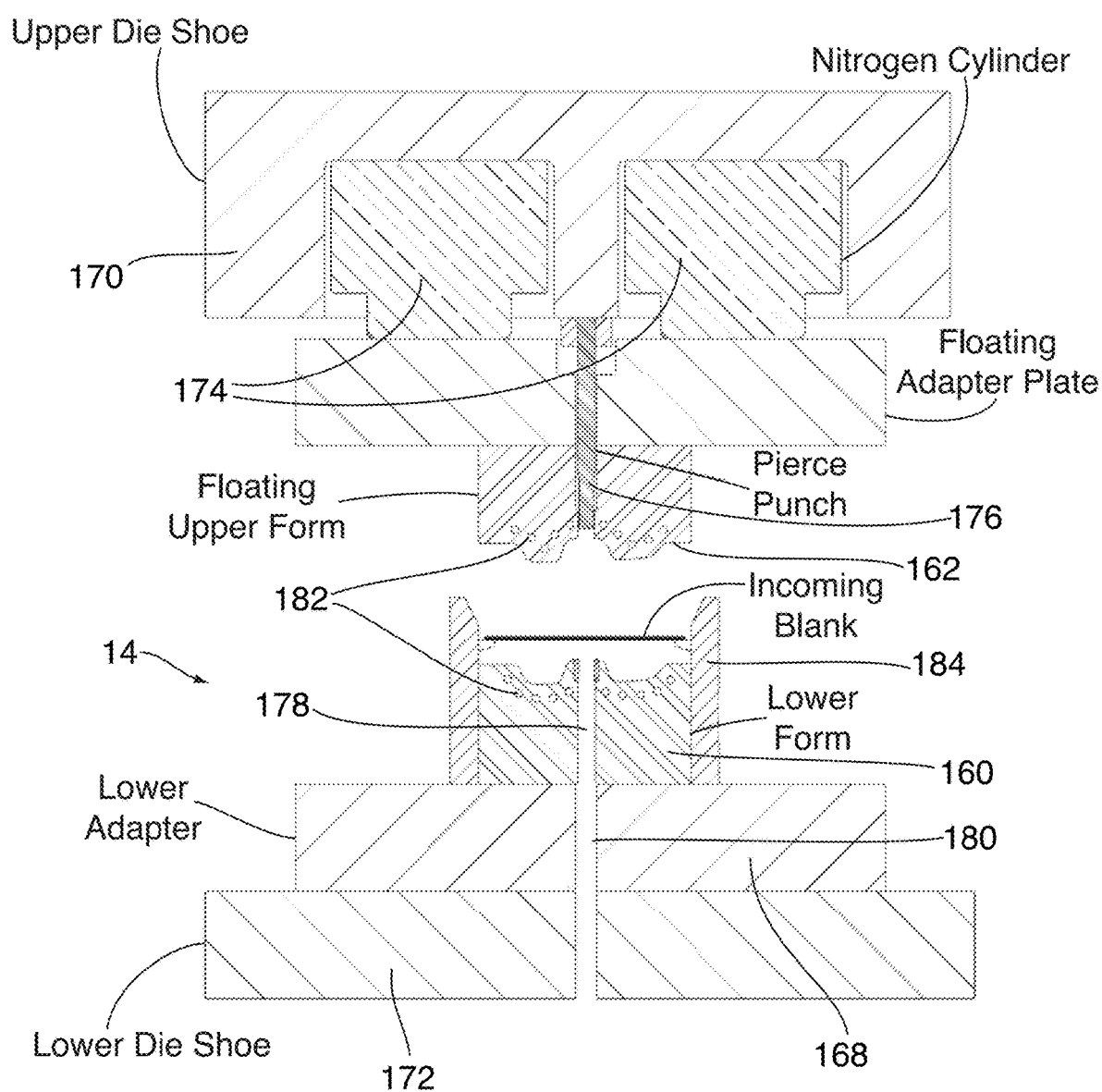
FIG. 15 is a schematic representation of the press of FIG. 11 in a forming position.
Figure 16:
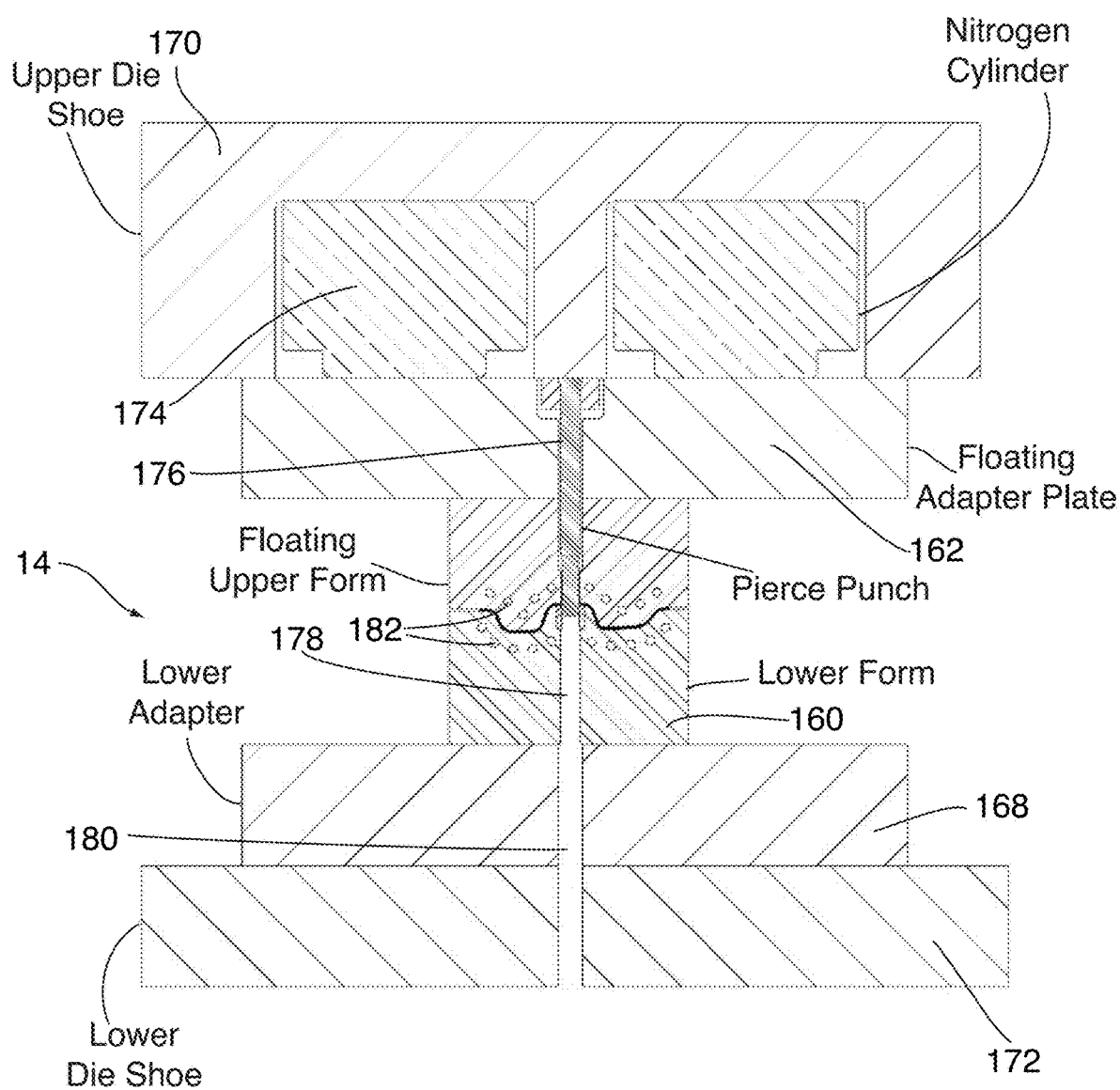
FIG. 16 is a schematic representation similar to FIG. 15 with the press fully closed

The door assemblies 116 may be selectively opened by the cylinders 146 allowing blanks B to be loaded and unloaded from opposite sides of the oven 12. After removal of a blank B by the unloading robot 18, it is placed on the open tool 160 of the press 14, shown in FIGS. 11 and 15 and 16.

The tool 160 has upper and lower forms 162, 164 whose opposed faces 163 and 165 respectively define the finished form of the blank B. The forms 162, 164 are mounted on adapter plates 166, 168 which in turn are mounted to upper and lower die shoes 170, 172 of the press 14. Nitrogen charged cylinders 174 are interposed between the upper adapter plate 166 and the upper die shoe 170 to permit it limited movement between the plate 166 and shoe 170 in the direction of movement of the shoes 170, 172. The nitrogen cylinders 174 normally act to bias the adapter plate 166 away from the upper die shoe 170. The cylinders 174 are distributed over the upper die shoe and collectively exert sufficient force to form the blank B between the forms 162, 164. In a typical application, the nitrogen charged cylinders 174 have an internal pressure in the order of 1600 psi. when extended and collectively exert a force in the order of 250 tons. The distribution of cylinders 174 and the aggregate force exerted is determined by the blank being formed during the stamp simulation and may be adjusted to suit the particular requirements.

Where a through hole is required in the blank B, a piercing punch 176 is secured to the upper die shoe 170 and extends through the upper adapter plate 166 and upper form 162. The piercing punch 176 is aligned with a corresponding bore 178 in the lower form 164 that opens to an ejection port 180.

A cooling system 182 is provided in the forms 162, 164 as will be described in greater detail below and gauges 184 project upwardly from the lower form 164 to locate the blank B against longitudinal movement. The gauges 184 also support the blanks B vertically to provide a space beneath the blanks B to allow the tines 154 of the material handling device 40 to pass.

In operation, the blanks B are removed from the pallet 22 and placed on a plinth on the transfer table 24. As noted above, parallel streams of blanks B are fed to the respective ovens 12 to enhance the throughput of the press 14. With the embodiment of FIG. 3, two blanks B are arranged side by side on each of the transfer tables 24, although, as will be explained below, other configurations are possible. The appropriate one of the robots 16 is directed to pick up the blanks B from the transfer table 24 and orientates the arms 32, 34 and wrist 36 so that the tines 54 are parallel to and slightly below the blanks B. The actuator 88 is retracted so that the pads 80 are spaced from the tines 54. The robot 16 advances the material handling device so that the tines 54 pass beneath the blanks B with the gripping mechanism above the blanks. When the tines are located beneath each of the blanks B, the actuator 88 is extended to push the rods 84 and move the foot toward the tine 54. At the same time, the robot 16 elevates the tines 54 to engage the blanks B. The foot 82 engages the upper side as the tines 54 engage the underside of the blank 54 and secure it relative to the material handling device 40.

With the blanks B secured, they can be transferred to the oven for heating. The controller 29 determines which of the heating zones is available and operates the cylinder 146 to open the associated door assembly 116 on the front wall 102. The door assembly swings open about the pivot pins 140 to provide access to the interior of the housing 100. The tines 54 on the material handling device 40 are aligned with the refractory notches 122, and move the blanks B in to the interior of the heating zone 108. The robot 16 then lowers the tines until the blanks B rest on the rods 130 forming the hearth 128. The gripping mechanism 70 is released, leaving the blanks resting on the rods, and the tines lowered and withdrawn along the channel between notches 122. The door assembly 116 is then closed and the robot returns the device 40 to the nesting table 24. It will be noted that during this loading, only one of the door assemblies 116 is open, thereby minimising heat loss, and that only mechanical components that are not vulnerable to elevated temperatures are subjected to the internal temperature of the oven 12.

After the blank B has been heated to the required temperature, or for the required duration, it can be removed using the robot 18. The respective door assembly 116 on the rear wall 104 is opened and the tines 54 slid along the channels between the notches 122 and beneath the blanks B. The feet 82 are retracted so they can pass over the blanks, and when in the correct position, are closed to clamp the blank B. The tines are lifted to lift the blanks off the rods 130 and allow removal from the heating zone 108. The door assembly 116 is again closed and the robot 18 transfers the heated blanks to the press 14.

The blanks are lowered on to gauges 184 and the gripping mechanism 70 released to allow withdrawal of the tines 54. After placement of the blanks B on the gauges 184, the press 14 closes, bringing the opposed faces 163, 165 into contact with the blank B. The faces 163, 165 form the blank B to the required shape and the cooling system 182 also rapidly cools the blank B at the rate required to obtain the desired metallurgical properties, as will be described in greater detail below. Continued movement of the die shoes 170, 172 toward one another collapses the nitrogen cylinders 170 to advance the piercing punch 176 through the blank B. The material removed by the piercing punch 176 is ejected through the port 178. The press 14 is then opened and the component C is removed from the press 14 by the unloading robot 26. The press 14 is then ready to receive a further blank Further blanks may be loaded in to available heating zones by the robot 16, whilst a blank is being heated and the loading from one side with removal from the other side of the oven 12 allows efficient loading and unloading of the blanks. Since load and unload is achieved by separate robots 16, 18, the blanks B that are to be loaded next in sequence can be staged by the controller 29 at the load door awaiting the extraction of the hot blanks from the opposite side. Once the extracted blanks are clear and the unload door closes, the opposite side of the oven can immediately open and load the cold blanks into the oven.

The positive action of the gripping mechanism 70 ensures control over the blanks at all times as they are placed on and taken off the stable surface of the hearth 126. The fork structure of the material handling device 40 exposes only the most rudimentary of components to the adverse environment within the oven 12, and the provision of the channels extending between the front wall and rear wall allows use of the tines while ensuring the blank is stably supported. It will also be appreciated that the multiple heating zones permits continued operation of the oven even if there is a malfunction in one of the heating zones, thereby maintaining the continuity of the process.

Figure 12:
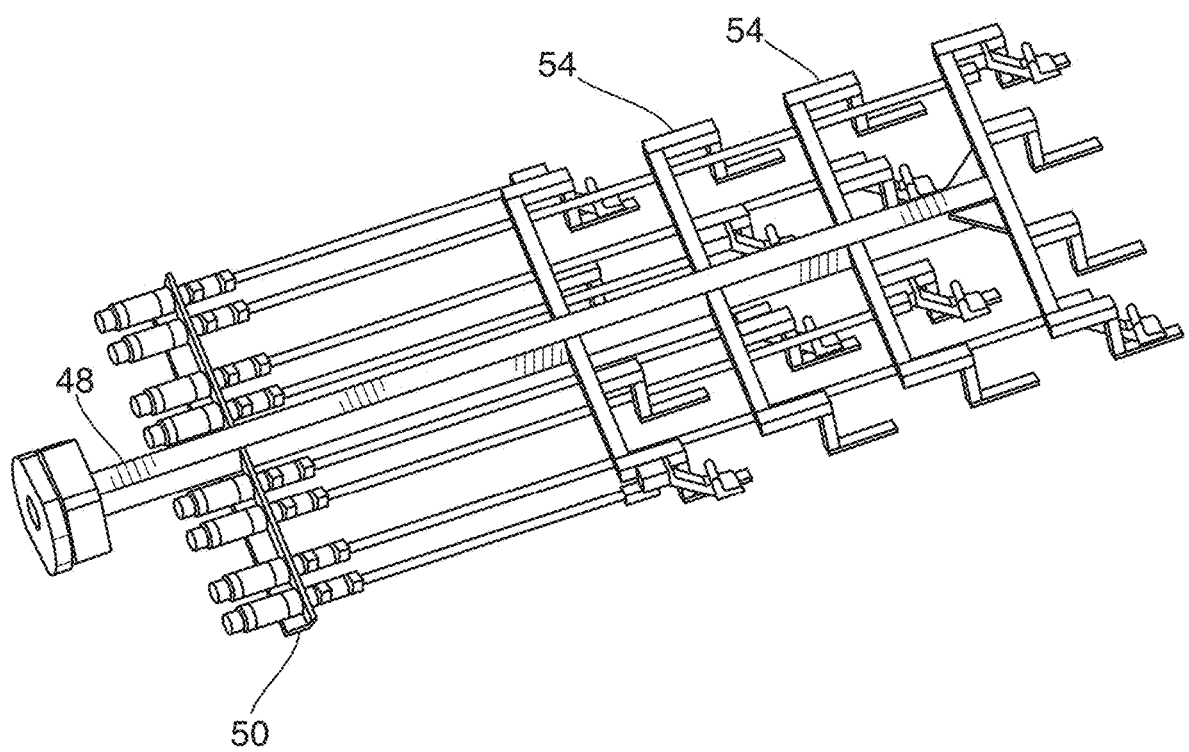
FIG. 12 is a view similar to FIG. 3 of a further embodiment of material handling tool

The material handling device 40 can take various forms depending on the blank B to be treated. The stub shaft 46 enables the beam 48 to be detached and a different device 40 having a different array of outriggers to be attached. As shown in FIG. 12, multiple outriggers may be arranged in seriatim with each having a gripping mechanism offset from the adjacent outrigger. In this arrangement, the fork assembly is retracted after placing the blank on the hearth, and then elevated to move the outriggers above the adjacent blank B.

Figure 13:
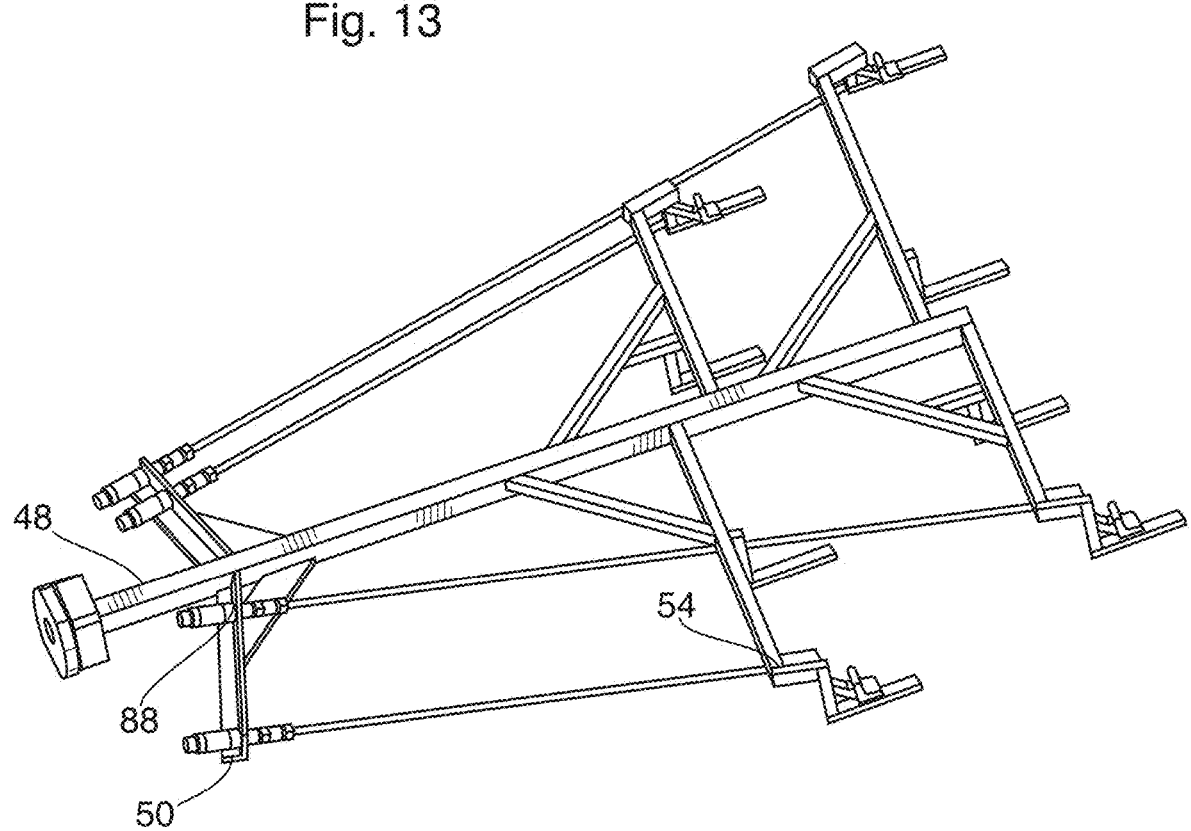
FIG. 13 is a view similar to FIG. 3 of a still further embodiment of material handling tool.

In the arrangement of FIG. 13, a pair of outriggers is positioned to each carry a single blank, permitting placement and removal as described above with FIG. 12. During placement and extraction, the robots 16, 18 manipulate the tines between and under the blanks B so they may be placed on the hearth 126.

Figure 14:
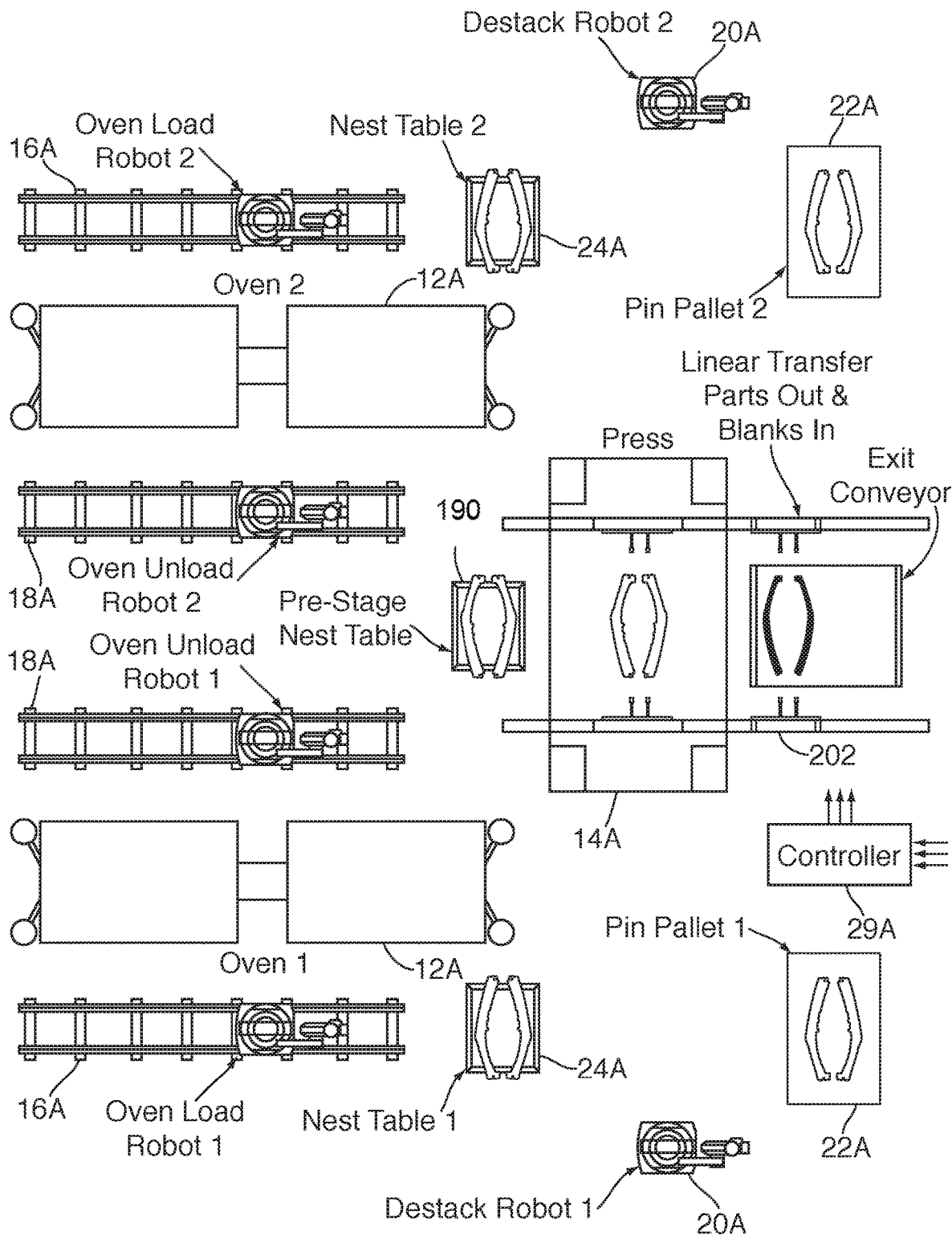
FIG. 14 is a schematic representation of a further embodiment of hot stamp cell.

The ovens 12 may also be arranged in a different configuration of stamp cell 10 where the press permits enhanced throughput. In the arrangement shown in FIG. 14, like components will be identified with like reference numerals with a suffix A added for clarity. In the arrangement of FIG. 14, two pairs of ovens 12A supply a common press 14A. Robots 16A are located to one side of each of the ovens and similar robots 18A are located between the ovens 12A and a pre-stage nesting table 190. A linear transfer conveyor 202 moves the blanks B from the nesting table 190 through the press 14A and to the exit conveyor 28A. The product flow through the ovens 12A is perpendicular to the flow through the press 14A, thereby allowing each of the robots 18A to transfer efficiently from the ovens to the nesting table 190.

De-stacking robots 20A are located between a pallet 22A and a transfer table 24A to transfers blanks B individually to the transfer table 24A. The blanks are held at the transfer table 24A until and a robot 16A secures the blanks B and transfers them into the oven 12A. The blanks B remain in the oven 12A until they have attained the required temperature and are then removed from the oven 12A by the robots 18A and placed onto the nesting table 190.

The robots 18 operate alternatively so that blanks are supplied from alternate ovens 12A to the nesting table 190. The residence time within each heating zone may then be increased relative to the cycle time of the press 14A. In the event of a malfunction of one of the heating zones, blanks can be processed and extracted from other heating zones, thereby maintaining throughput of the blanks to the press 14A. As in the previous embodiment, the loading and unloading of the blanks in the ovens maintains control of the blanks B to avoid misplacement and the material handling tool is subjected only to intermittent heating during placement in the oven.

Figure 17:
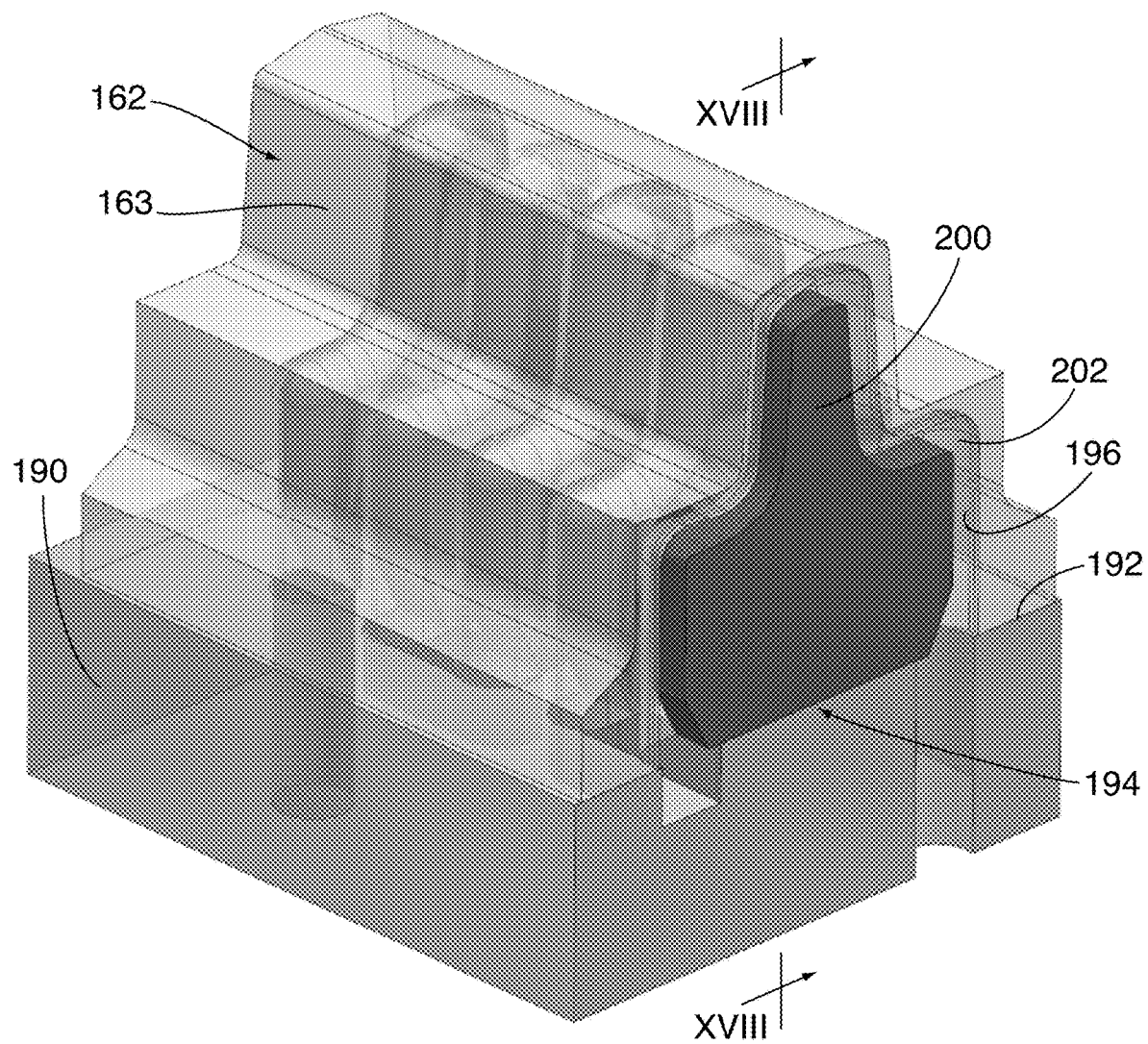
FIG. 17 is a perspective of a die shown in FIG. 15 to show a cooling system of the die.

The close control of the heating and handling of the blank B as described above enables the press 14 to be adapted and utilised to enhance the production of the finished components C. The cooling of the blanks B is controlled within the tool 160 by the cooling system 182 which is shown in greater detail in FIGS. 17-19.

Each of the forms 162, 164 has a base 190 that is supported on a mating face 192 of a respective adapter plate 166, 168 to provide an interface 194. A series of cavities 196 extend inwardly from the base 190. The cavities 196 are formed as parallel slots in the forms 162, 164 and so adjacent cavities 196 are separated by walls 198. Each of the cavities 196 is generally similar to the overall profile of the opposed faces 163, 165, so as to provide a substantially uniform wall thickness of sufficient rigidity and strength to withstand the stamping operation.

A baffle 200 is located in each of the cavities 196 and has a thickness corresponding to the spacing between the walls 198. The perimeter of the baffle 200 is also similar in shape to the periphery of the cavity 196 but slightly smaller to provide a channel 202 between the edge of the baffle 200 and the outer wall of the cavity 196. As shown, the channel 202 is substantially uniform in cross section and extends from one side of the form 162, 164 to the other.

Figure 18:
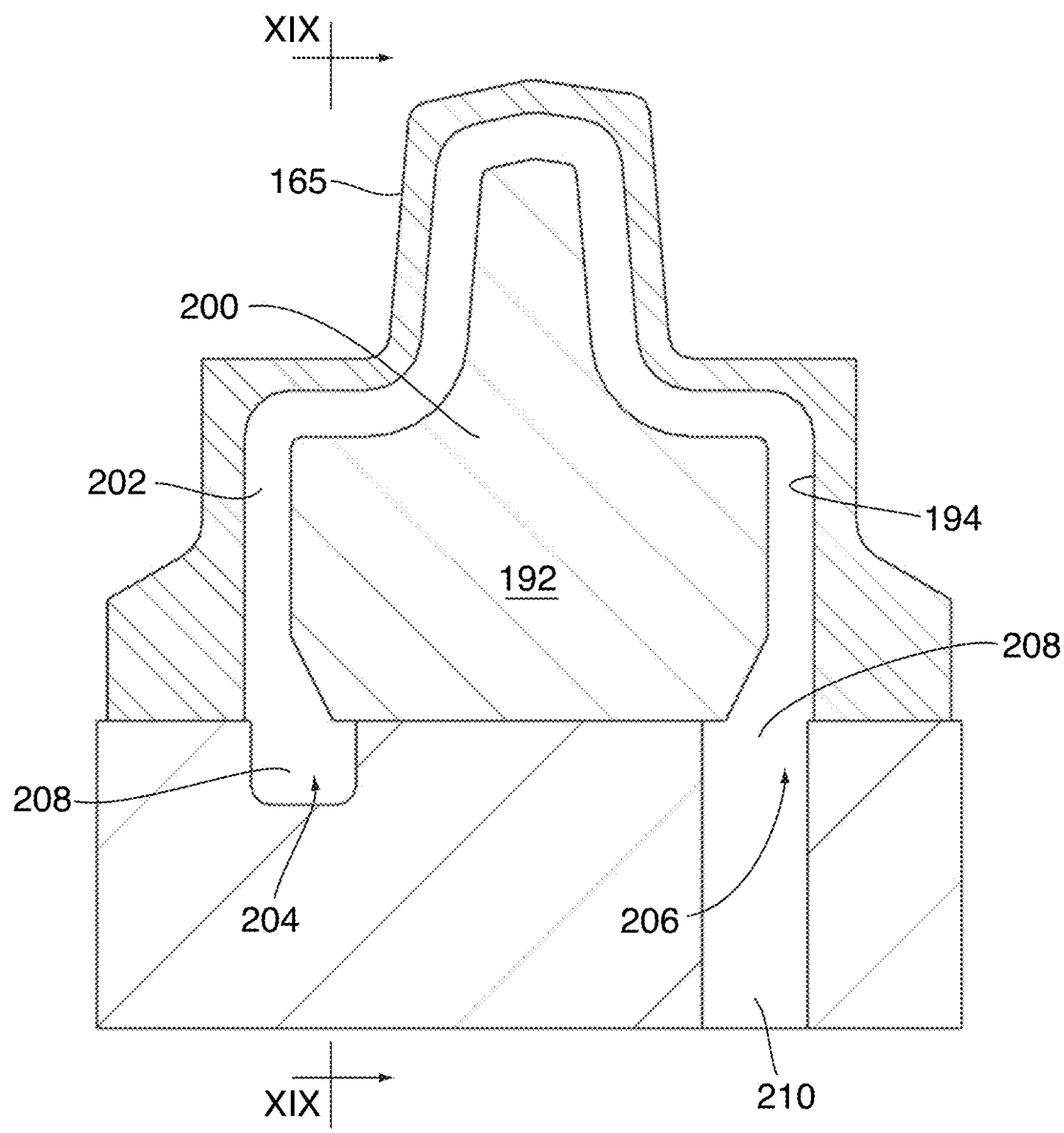
FIG. 18 is a view on the line XVIII-XVIII of FIG. 17.
Figure 19:
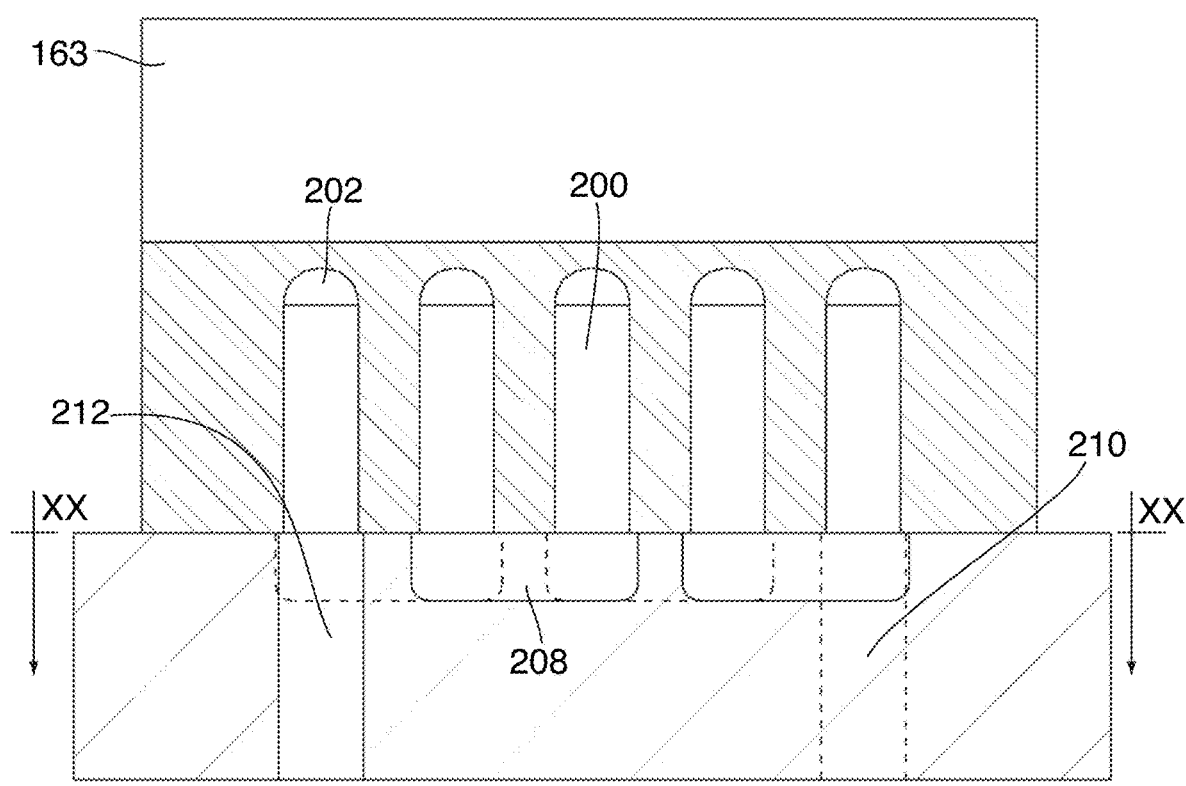
FIG. 19 is a view on the line XIX-XIX of FIG. 18.
Figure 20:
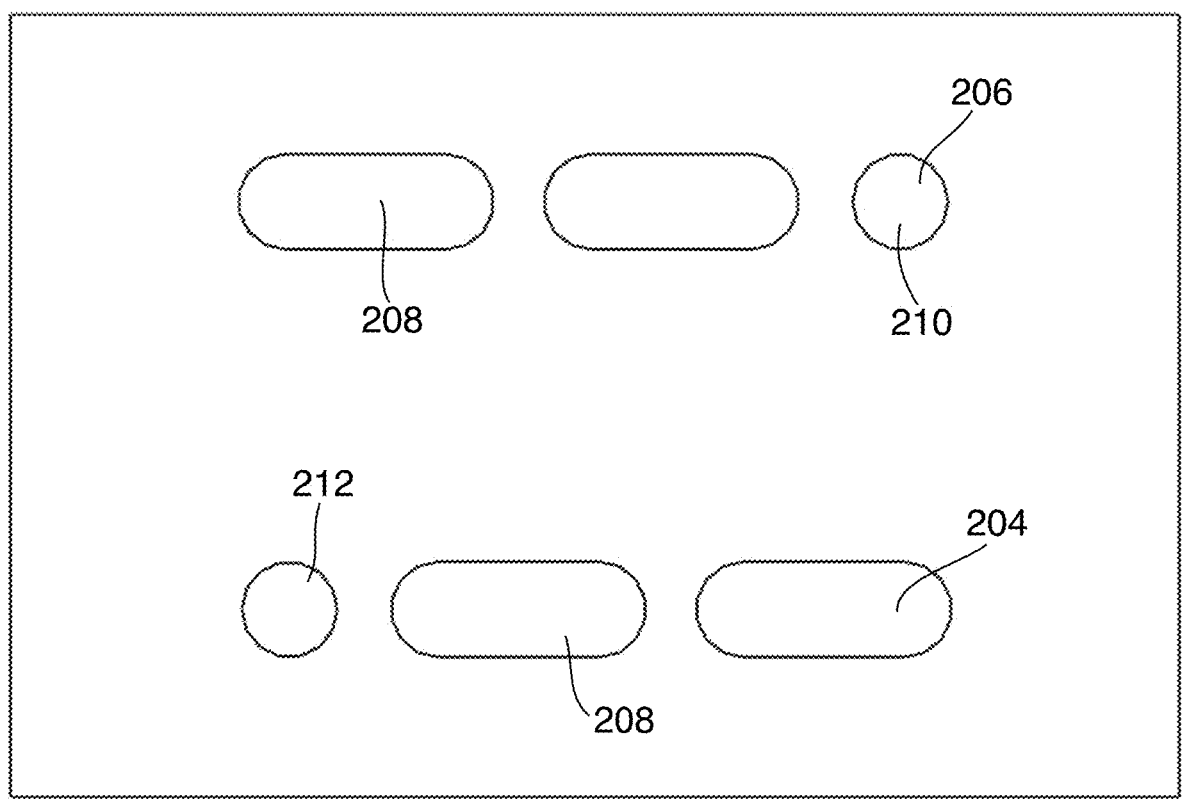
FIG. 20 is a plan view on the line XX-XX of FIG. 19.

Coolant is supplied to the channels 202 through ducting in the mating face 192 of the adapter plate 166, 168. As best seen in FIGS. 18 and 19, the mating face 192 includes two sets 204, 206 of recesses 208 that are generally aligned with opposite ends of each channel 202. The recesses 208 of one of the sets 204 is offset from the recess of the other set 206 so that in combination with the channels 202, a serpentine path is provided for coolant through the form 162, 164. An inlet 210 is provided at one end of the form for connection to a cooling source, typically water, and an outlet 212 is provided at the opposite end of the form to return coolant. A gasket (not shown) seals at the interface 194 to contain coolant.

In use, the coolant is introduced at the inlet 210 and flows through the first channel 202 to the recess 208 at the opposite side of the form. The recess 208 bridges the wall to allow coolant to enter the next channel 202 and back across the form. The flow continues through the channels in series until the outlet 210 is reached. The serial flow of coolant through the form provides a high velocity flow that reduces air pockets that might occur and ensures a uniform cooling effect along the form. As a result, an efficient heat extraction is provided at a predictable rate of cooling.

Figure 21:
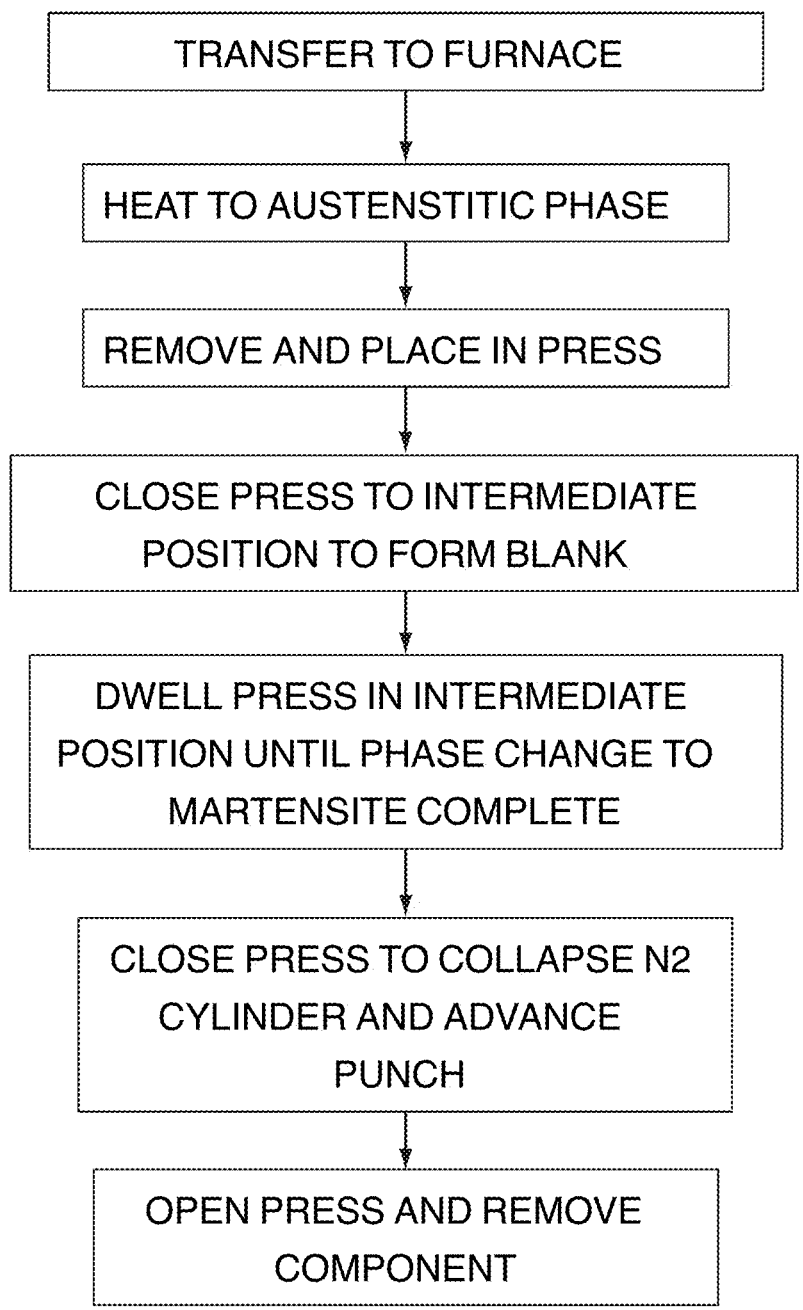
FIG. 21 is a flow diagram of the process implemented by the hot stamp cell.

The individual transfer of blanks B through the oven and to the press 14 facilitates close control of the properties of the blank B and the arrangement of the press 14 provides further opportunity to control the finished product C. The sequence is shown in FIG. 21 where typically the material will be heated in the furnace beyond the AC3 point so that, in the case of carbon steel, full austenization occurs prior to removal from the furnace. After placement within the press, the upper and lower dies shoes are closed to the position shown in FIG. 15 so that the blank B is held between the opposed form surfaces 163, 165. The blank B is still in the austenite phase during the forming but the temperature of the blank B within the press 14 will be rapidly cooled by the cooling system 182. During the cooling, the material of the blank will undergo changes from one metallurgical condition to another that depend on the characteristics of the material and the rate of cooling. Again, for carbon steel, the blank B undergoes a phase change from austenite to martensite as it is cooled. During this phase transformation, the blank B is held between the faces 163, 165 and the volumetric changes that occur when the carbon steel blank B transforms from face-centered cubic austenite to body-centered cubic martensite as well as the shrinkage due to large temperature deltas happens while the blank is held by the forms.

Once the metallurgical transformation has occurred, the press is operated to further close the dies so that the nitrogen charged cylinders 174 collapse to bring the die in to engagement with the adapter plate. This advances the punch so that the blank is pierced while held between the forms and with the blank B in the martensite phase. Because the dimensional changes associated with phase change and cooling have occurred, the hole accuracy may be improved. The burr height around the pierced hole is also reduced when piercing the martensitic material, versus the more malleable, higher-temperature steel.

By dwelling the form steels while forming the blank B and piercing after the form is completely set on the part by floating the upper form sections with high tonnage nitrogen cylinders it is found that there is no significant material movement during or after piercing.

The dwell period of the press will of course depend on the blank B being formed. The particular period utilised for a given component may be determined empirically based on the initial temperature of the blank B and the rate of cooling attained from the cooling system, as well of course as the characteristics of the material of the blank B. For a typical automotive component a dwell period of between 6 and 10 seconds is usual, typically 8 seconds, depending on the thickness of the blank B. The dwell period may be programmed in to the press operations as part of the normal operating parameters.

Once the blank is fully formed, the press 14 is opened and the component C is removed.

What is claimed is:

1. A hot stamp cell having
a source of at least one blank,
an oven to elevate the temperature of said blank, and
a press to form said blank to a required shape,
said oven having openings on opposite sides to permit loading of said blank from one side and unloading of said blank from another, each of said openings having a door assembly to selectively cover and uncover a respective one of said openings,
said hot stamp cell including a first robot to move said blank from the source to the oven through one of said openings and a second robot to remove said blank from the oven through the other of said openings, each of the robots having a material handling device that includes a fork with tines to carry said blank and a gripping mechanism moveable into engagement with said blank to secure said blank to the tines,
said oven having a hearth to provide a support surface within said oven to allow stable support of said blank during heating, said hearth having channels extending between the openings,
said channels dimensioned to receive the tines of the material handling device during placement of said blank on the hearth, said channels permitting placement of said blank on to the support surface by lowering of the fork relative to the hearth and subsequent removal of the fork from the oven,
said oven having a refractory lining and said channels extending through said refractory lining.

2. The hot stamp cell of claim 1 wherein the gripping mechanism engages the opposite side of the blank to the tines and is releasable upon placement of the blank on the support surface.

3. The hot stamp cell of claim 2 wherein said gripping mechanism includes an at least one foot moveable relative to the tines to vary the spacing therebetween.

4. The hot stamp cell of claim 3 wherein an actuator operates upon said at least one foot to effect movement thereof and a linkage connects said actuator to said foot.

5. The hot stamp cell of claim 4 wherein said at least one foot comprises a plurality of feet laterally spaced on said material handling device with a linkage associated with each of said feet.

6. The hot stamp cell of claim 1 wherein said refractory lining extends above an edge of said openings to provide a projection, and said channels are located in said projection.

7. The hot stamp cell of claim 6 wherein an upper edge of said projection is castellated to provide notches in said refractory lining forming said channels with upstanding lands between said notches.

8. The hot stamp cell of claim 7 wherein said hearth is formed by a plurality of rods extending between said openings, said rods being received at opposite ends in recesses in said lands.

9. The hot stamp cell of claim of claim 1 wherein said door assemblies are pivotally connected to an upper edge of said respective one of said openings.

10. The hot stamp cell of claim 9 wherein said door assemblies pivot about an axis offset from the centre of mass of said door assembly to provide a closing force to said door assembly.

11. The hot stamp cell of claim 10 wherein said door assemblies have a flexible gasket lining about its periphery to seal against said respective one of said openings.

12. The hot stamp cell of claim 1 wherein said press includes a plurality of gauges upstanding from a bed of said press to support said blank placed thereon.

13. The hot stamp cell of claim 12 wherein said gauges maintain said blank above said bed to permit said tines to pass beneath said blank.

14. The hot stamp cell of claim 13 wherein said gauges inhibit movement of said blank as said tines are withdrawn.

\* \* \* \* \*